United States Patent
Wen

(10) Patent No.: US 11,257,039 B2
(45) Date of Patent: Feb. 22, 2022

(54) DIGITAL WORK GENERATING DEVICE, METHOD AND COMPUTER-READABLE STORAGE MEDIUM

(71) Applicant: BOE TECHNOLOGY GROUP CO., LTD., Beijing (CN)

(72) Inventor: Ken Wen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 337 days.

(21) Appl. No.: 16/412,862

(22) Filed: May 15, 2019

(65) Prior Publication Data

US 2020/0104795 A1  Apr. 2, 2020

(30) Foreign Application Priority Data

Sep. 30, 2018 (CN) .......................... 201811159283.9

(51) Int. Cl.
| | |
|---|---|
| G06F 8/41 | (2018.01) |
| G06Q 10/10 | (2012.01) |
| G06F 16/958 | (2019.01) |
| G06F 16/438 | (2019.01) |
| G06F 40/169 | (2020.01) |

(52) U.S. Cl.
CPC ......... *G06Q 10/101* (2013.01); *G06F 16/438* (2019.01); *G06F 16/958* (2019.01); *G06F 40/169* (2020.01)

(58) Field of Classification Search
CPC ... G06Q 10/101; G06F 40/169; G06F 16/958; G06F 16/438
See application file for complete search history.

(56) References Cited

U.S. PATENT DOCUMENTS

| | | | | |
|---|---|---|---|---|
| 8,972,737 | B2* | 3/2015 | Nonaka | H04L 9/3247 713/176 |
| 9,143,542 | B1* | 9/2015 | Tseytlin | A61B 6/00 |
| 9,880,718 | B1* | 1/2018 | Casale | H04L 12/1822 |
| 9,983,759 | B1* | 5/2018 | Dhawan | G06F 3/048 |
| 10,083,160 | B1* | 9/2018 | Yu | G06F 3/0483 |
| 10,198,714 | B1* | 2/2019 | Tseytlin | H04L 65/605 |
| 10,599,758 | B1* | 3/2020 | Yu | G06F 16/24573 |

(Continued)

FOREIGN PATENT DOCUMENTS

| | | |
|---|---|---|
| CN | 104915328 A | 9/2015 |
| CN | 105138625 A | 12/2015 |
| CN | 108509404 A | 9/2018 |

OTHER PUBLICATIONS

First Chinese Office Action from Chinese Patent Application No. 201811159283.9 dated Jun. 30, 2021.

*Primary Examiner* — Hassan Mrabi

(74) *Attorney, Agent, or Firm* — Dilworth & Barrese, LLP.; Michael J. Musella, Esq.

(57) ABSTRACT

A digital work generating device, a digital work generating method and a computer-readable storage medium are provided. The digital work generating device includes: an obtaining unit configured to obtain presetting information and an initial content of the digital work; a generating unit configured to generate at least one partial content of the digital work according to the initial content and the presetting information; and a processing unit configured to process the initial content and the at least one partial content to generate the digital work.

18 Claims, 9 Drawing Sheets

(56) References Cited

U.S. PATENT DOCUMENTS

| | | | | |
|---|---|---|---|---|
| 2003/0083923 | A1* | 5/2003 | Guicciardi | G06Q 10/101 705/300 |
| 2005/0213147 | A1* | 9/2005 | Minatogawa | G06F 16/958 358/1.15 |
| 2009/0157490 | A1* | 6/2009 | Lawyer | G06F 16/23 705/59 |
| 2011/0065082 | A1* | 3/2011 | Gal | G09B 7/02 434/365 |
| 2011/0154192 | A1* | 6/2011 | Yang | G06F 40/197 715/256 |
| 2013/0024418 | A1* | 1/2013 | Sitrick | G06F 40/169 707/608 |
| 2014/0129842 | A1* | 5/2014 | Nonaka | G06F 21/10 713/176 |
| 2015/0007036 | A1* | 1/2015 | Jin | G06Q 10/101 715/733 |
| 2015/0195313 | A1* | 7/2015 | Lewis | G06Q 10/101 709/204 |
| 2015/0281325 | A1* | 10/2015 | Takaichi | A63F 13/20 715/232 |
| 2016/0357720 | A1* | 12/2016 | Thimbleby | G06F 3/0484 |
| 2017/0262451 | A1* | 9/2017 | Milner | G06Q 50/01 |
| 2018/0165645 | A1* | 6/2018 | Magpayo | H04N 1/00161 |
| 2019/0095436 | A1* | 3/2019 | Martinazzi | G06T 11/60 |
| 2019/0097823 | A1* | 3/2019 | Simonyi | G06F 16/93 |
| 2020/0322754 | A1* | 10/2020 | Soule | H04N 7/15 |

* cited by examiner

DIGITAL WORK GENERATING DEVICE, METHOD AND COMPUTER-READABLE STORAGE MEDIUM

TECHNICAL FIELD

Embodiments of the present disclosure relate to a digital work generating device, a digital work generating method and a computer-readable storage medium.

BACKGROUND

At present, a sharing mode of a digital work usually includes: a user uploads a digital work onto a server through a client terminal after the user finishes the digital work; the server sends the digital work finished by the user to client terminals of other users for exhibition; then the other users enjoy and comment the digital work through their client terminals, respectively. In this way, the digital work is shared among a plurality of users.

SUMMARY

At least one embodiment of the present disclosure provides a digital work generating device, a digital work generating method and a computer-readable storage medium, with the objective of providing a multimedia sharing mode which allows for sharing the entire editing and processing procedure of the digital work.

In order to achieve the objective above, at least one embodiment of the present disclosure adopts the following technical solution(s).

On the first aspect, an embodiment of the present disclosure provides a digital work generating device, including:

an obtaining unit configured to obtain presetting information and an initial content of the digital work;

a generating unit configured to generate at least one partial content of the digital work according to the initial content and the presetting information; and a processing unit configured to process the initial content and the at least one partial content to generate the digital work.

On the second aspect, an embodiment of the present disclosure provides a digital work generating method, including:

obtaining presetting information and an initial content of the digital work;

generating at least one partial content of the digital work according to the initial content and the presetting information; and processing the initial content and the at least one partial content to generate the digital work.

On the third aspect, an embodiment of the present disclosure provides a computer-readable storage medium stored with a computer-readable instruction. The computer-readable instruction, when executed by a processer, is configured to cause the processer to perform the digital work generating method provided by the second aspect of the present disclosure.

BRIEF DESCRIPTION OF THE DRAWINGS

Hereinafter, the drawings necessary for description of embodiments of the present disclosure are simply introduced in order to more clearly explain technical solution(s) of the embodiments of the present disclosure.

DETAILED DESCRIPTION

In order to make objects, technical details and advantages of the embodiments of the disclosure apparent, technical solutions according to the embodiments of the present disclosure will be described clearly and completely as below in conjunction with the accompanying drawings of embodiments of the present disclosure. Apparently, the described embodiments are only a part of but not all of exemplary embodiments of the present disclosure. Based on the described embodiments of the present disclosure, various other embodiments can be obtained by those of ordinary skill in the art without creative labor and those embodiments shall fall into the protection scope of the present disclosure.

Unless otherwise defined, the technical terminology or scientific terminology used herein should have the same meaning as commonly understood by one of ordinary skill in the art to which this disclosure belongs. Likewise, terms like "first," "second," etc., which are used in the description and the claims of the present application for disclosure, are not intended to indicate any sequence, amount or importance, but distinguish various components. The phrases "connect", "connected", etc., are not intended to define a physical connection or mechanical connection, but may include an electrical connection, directly or indirectly.

Inventor(s) of the present invention noticed that, in the exiting sharing mode of a digital work, a creator of the digital work is unable to exhibit his/her thoughts as well as editing and processing procedure of generating the digital work, and other users can only enjoy and comment the digital work having been finished without good interaction and communication with the creator in real time during the editing and processing procedure of generating the digital work. This is easy to cause other users to lose interests in sharing the digital work, because they cannot be participated in the digital work, which degrades an experience of users.

At least one embodiment of the present disclosure provides a digital work generating device, a digital work generating method and a computer-readable storage medium, with the objective of providing a multimedia sharing mode which allows for sharing the entire editing and processing procedure of generating the digital work.

Figure 1:
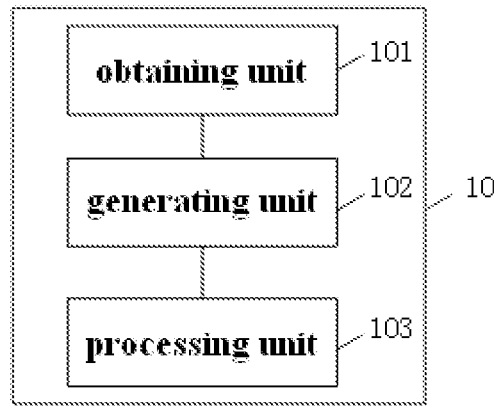
FIG. 1 is a structural diagram illustrating a digital work generating device provided by an embodiment of the present disclosure.

An embodiment of the present disclosure provides a digital work generating device. FIG. 1 is a structural diagram illustrating a digital work generating device provided by an embodiment of the present disclosure. As illustrated in FIG. 1, the digital work generating device 10 includes an obtaining unit 101, a generating unit 102 and a processing unit 103.

The obtaining unit 101 is configured to obtain presetting information and an initial content of the digital work.

The generating unit 102 is configured to generate at least one partial content of the digital work according to the initial content and the presetting information.

The processing unit 103 is configured to process the initial content and the at least one partial content to generate the digital work.

It should be explained that, the obtaining unit 101 can be a client terminal which is mounted on a terminal device and configured to process a digital work; and the obtaining unit 101 can also be a webpage. The terminal device can be a desktop computer, a notebook computer, a tablet computer, a mobile phone or the like. A user can upload an initial content of a digital work through the terminal device, and the initial content of the digital work is in an editable state for other users to edit. The presetting information can be predetermined by the user who uploads the initial content, and can also be automatically selected by the system.

It should be explained that, the generating unit 102 can be configured to operate the initial content by following the user's thoughts according to the initial content and the presetting information, so as to generate at least one partial content which constitutes a part of a digital work to be finished.

It should be explained that, the processing unit 103 can be configured to process the initial content and the at least one partial content generated in the generating unit 102 by following the user's thoughts, so as to generate a final digital work.

It should be appreciated that, a connecting mode or a coupling mode among the obtaining unit 101, the generating unit 102 and the processing unit 103 can be a wired connection/coupling, a wireless connection/coupling or a virtual connection/coupling. The users can upload the partial contents of the digital work as generated by different devices onto a server, and these devices can be connected through a network in wired manner or wireless manner. Alternatively, a plurality of users can operate the initial content on a same device at different times, respectively, and store the partial contents as generated in a local storage; after all the users finish generating and storing their partial contents, the plurality of partial contents can be processed by a same device so as to generate the final digital work. The entire operating and processing procedure can be directly performed through the network, and can also be performed on a local device.

By using the digital work generating device provided by the embodiment of the present disclosure, a plurality of users can operate an uploaded initial content of a digital work according to presetting information to achieve operating and processing a same digital work by multiple users, so that multiple users can share an entire generating process from an initial content to a final digital work. In this way, the users not only can enjoy and comment a finished digital work but also can actually participate in the digital work, thereby improving the sense of participation of the users.

Hereinafter, several embodiments of the digital work generating device in the present disclosure will be described in more details with reference to FIG. 2-FIG. 7.

According to an embodiment of the present disclosure, the generating unit 102 in the digital work generating device can include a plurality of sub-generators, for example, a first sub-generator 1021, a second sub-generator 1022, ..., a $n^{th}$ sub-generator 102$n$, in which n is a natural number greater than 0. Each of the sub-generators can be corresponding to one partial content.

Figure 2:
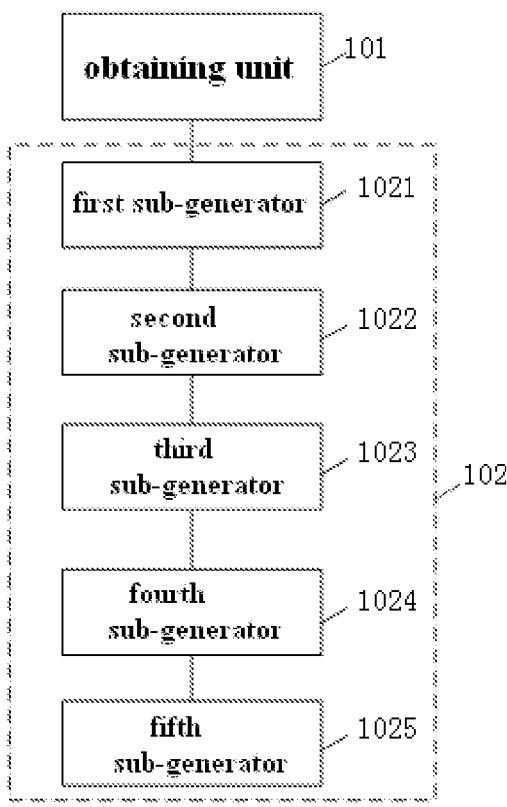
FIG. 2 is a structural diagram illustrating a generating unit in the digital work generating device provided by an embodiment of the present disclosure.

FIG. 2 is a structural diagram illustrating a generating unit in the digital work generating device provided by an embodiment of the present disclosure. As illustrated in FIG. 2, in the case where a connecting/coupling mode among the plurality of sub-generators 1021-201$n$ includes cascaded coupling, each of the sub-generators generates a partial content of the sub-generator according to a content input by a participator corresponding to the sub-generator; then a current sub-generator operates a partial content of the current sub-generator and one of the initial content and an intermediate partial content generated and output by a previous sub-generator, so as to generate an intermediate partial content of the current sub-generator.

Optionally, after the presetting information and the initial content of the digital work are uploaded through the obtaining unit 101, the participator can utilize the generating unit illustrated in FIG. 2 to operate the initial content or the intermediate partial content output by the previous sub-generator, according to the presetting information. The number of the participator can be specified by the user who uploads the digital work. For example, the presetting information can include information of number of participator to indicate the number of the participator, which can be five, for example; correspondingly, the number of the sub-generator is also five. For example, the first participator corresponds to the first sub-generator 1021; the second participator corresponds to the second sub-generator 1022; the third participator corresponds to the third sub-generator 1023; the fourth participator corresponds to the fourth sub-generator 1024; and the fifth participator corresponds to the fifth sub-generator 1025.

It should be appreciated that, because the connecting/coupling mode among the sub-generators in the structure of the generating unit illustrated in FIG. 2 includes cascaded coupling, the first participator utilizes the first sub-generator 1021 to operate according to the initial content and the presetting information, so as to generate a partial content made by the first participator, and then generate an intermediate partial content (i.e., a first intermediate partial content) of the first participator from the initial content and the partial content made by the first participator; the next participator proceeds with the operation by utilizing the intermediate partial content made by the previous participator, so as to generate a corresponding intermediate partial content; the rest can be done in the same manner, until the fifth participator finishes operation and generates a fifth intermediate partial content.

Figure 3:
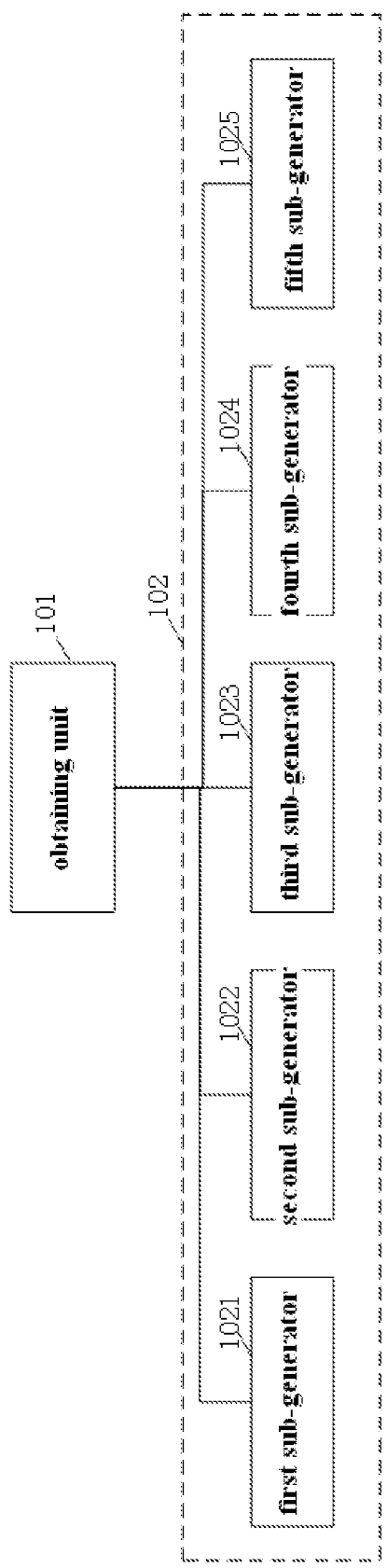
FIG. 3 is a structural diagram illustrating another generating unit in the digital work generating device provided by an embodiment of the present disclosure.

FIG. 3 is a structural diagram illustrating another generating unit in the digital work generating device provided by an embodiment of the present disclosure. As illustrated in FIG. 3, given that the connecting/coupling mode among the plurality of sub-generators includes parallel coupling, each of the sub-generators generates a partial content of the sub-generator according to a content input by a participator corresponding to the sub-generator, and then operates the initial content and the partial content generated by the sub-generator according to the presetting information, so as to generate an intermediate partial content of the sub-generator.

Optionally, after the presetting information and the initial content of the digital work are uploaded through the obtaining unit 101, the participator can utilize the generating unit illustrated in FIG. 3 to operate the initial content according to the presetting information. The number of the participator can be specified by the user who uploads the digital work. For example, the presetting information can include information of number of participator to indicate the number of the participator, which can be five, for example; correspondingly, the number of the sub-generators is also five. For example, the first participator utilizes the first sub-generator 1021; the second participator utilizes the second sub-generator 1022; the third participator utilizes the third sub-generator 1023; the fourth participator utilizes the fourth sub-generator 1024; and the fifth participator utilizes the fifth sub-generator 1025, so as to operate the initial content respectively.

It should be appreciated that, because the connecting/coupling mode among the sub-generators in the structure of the generating unit illustrated in FIG. 3 includes parallel coupling, the first participator utilizes the first sub-generator 1021 to operate according to the initial content and the presetting information, so as to generate a partial content made by the first participator; the second participator utilizes the second sub-generator 1022 to operate according to the initial content and the presetting information, so as to generate a partial content made by the second participator; the rest can be done in the same manner, until the fifth participator utilizes the fifth sub-generator 1025 to generate a partial content made by the fifth participator. For example, it's unnecessary for the five partial contents made by the five participators corresponding to the five sub-generators to be correlated with each other; instead, the five participators can operate the initial content only by combining with his/her own editing thoughts.

Figure 4:
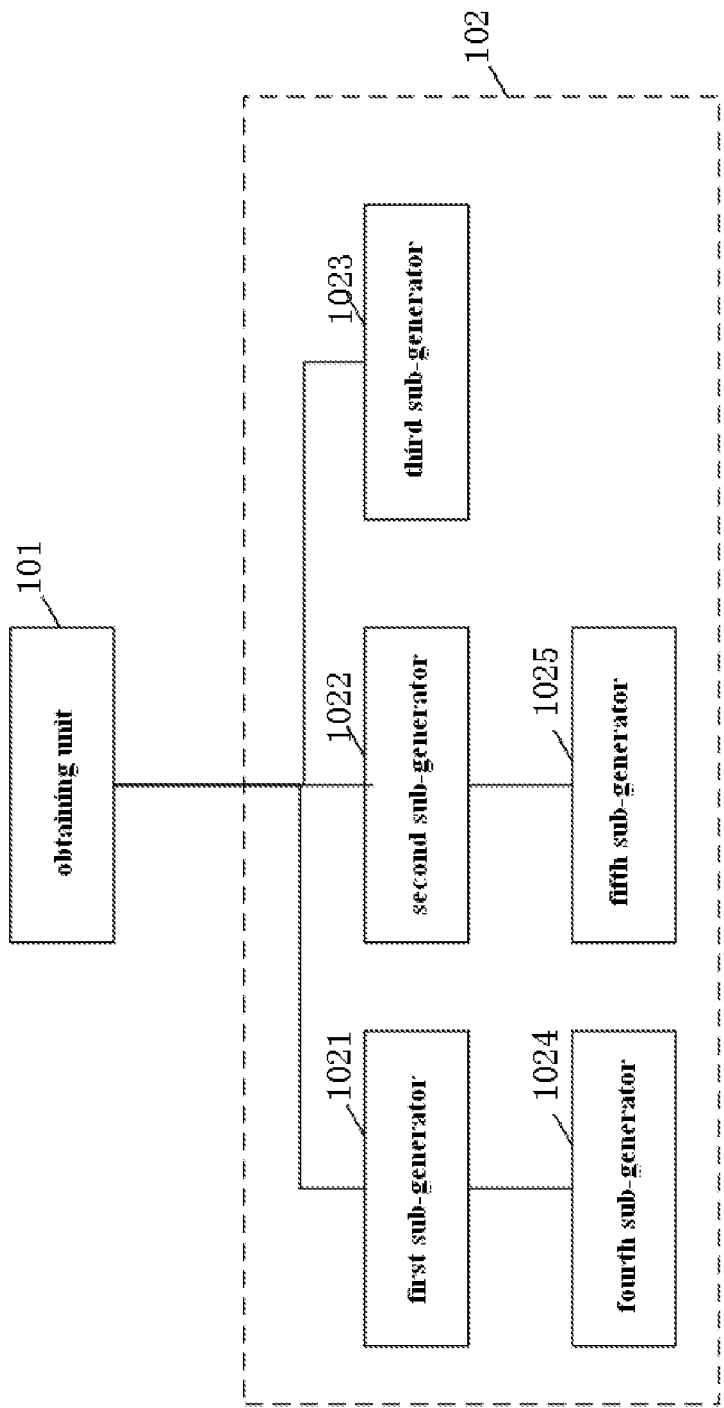
FIG. 4 is a structural diagram illustrating yet another generating unit in the digital work generating device provided by an embodiment of the present disclosure.

FIG. 4 is a structural diagram illustrating yet another generating unit in the digital work generating device provided by an embodiment of the present disclosure. As illustrated in FIG. 4, given that the connecting/coupling mode among the plurality of sub-generators includes a combination of cascaded coupling and parallel coupling and given that the parallel coupling includes at least one parallel branch, each of sub-generators in each parallel branch can be configured to: generate a partial content of a current sub-generator according to a content input by a participator corresponding to the current sub-generator; and operates the partial content of the current sub-generator and one of the initial content, an intermediate partial content output by a last sub-generator in a previous parallel branch and an intermediate partial content output by a previous sub-generator in a current parallel branch according to the presetting information, so as to generate an intermediate partial content of the current sub-generator.

Optionally, after the presetting information and the initial content of the digital work are uploaded through the obtaining unit 101, the participator can utilize the generating unit illustrated in FIG. 4 to operate the initial content according to the presetting information. The number of the participator can be specified by the user who uploads the digital work. For example, the presetting information can include information of number of participator to indicate the number of the participator, which can be five, for example; correspondingly, the number of the sub-generator is also five. For example, the first participator corresponds to the first sub-generator 1021; the second participator corresponds to the second sub-generator 1022; the third participator corresponds to the third sub-generator 1023; the fourth participator corresponds to the fourth sub-generator 1024; and the fifth participator corresponds to the fifth sub-generator 1025.

It should be appreciated that, the connecting/coupling mode among the sub-generators in the structure of the generating unit illustrated in FIG. 4 includes a combination of cascaded coupling and parallel coupling, and the parallel coupling includes at least one parallel branch; for example, the connecting/coupling mode among the first sub-generator 1021, the second sub-generator 1022 and the third sub-generator 1023 is parallel coupling; in a parallel branch corresponding to the first sub-generator 1021, the first sub-generator 1021 and the fourth sub-generator 1024 are connected in a manner of cascaded coupling; in a parallel branch corresponding to the second sub-generator 1022, the second sub-generator 1022 and the fifth sub-generator 1025 are connected in a manner of cascaded coupling. However, the embodiment of the present disclosure is not limited thereto. Hereinafter, the generating unit in the embodiment of the present disclosure will be described with reference to the connecting/coupling mode in FIG. 4, by way of example.

The first participator utilizes the first sub-generator 1021 to operate according to the initial content and the presetting information, so as to generate a partial content made by the first participator, and also to generate an intermediate partial content of the first participator from the partial content of the first participator and the initial content. The fourth participator utilizes the fourth sub-generator 1024 to proceed with the operation on the basis of the intermediate partial content generated by the first sub-generator, so as to generate an intermediate partial content corresponding to the fourth sub-generator 1024.

The second participator utilizes the second sub-generator 1022 to operate according to the initial content and the presetting information, so as to generate a partial content made by the second participator, and also to generate an intermediate partial content of the second participator from the partial content of the second participator and the initial content. The fifth participator utilizes the fifth sub-generator 1025 to proceed with the operation on the basis of the intermediate partial content generated by the second sub-generator, so as to generate an intermediate partial content of the fifth participator corresponding to the fifth sub-generator 1025.

The third participator utilizes the third sub-generator 1023 to operate according to the initial content and the presetting information, so as to generate a partial content made by the third participator, and also to generate an intermediate partial content of the third participator from the partial content of the third participator and the initial content.

Optionally, in the embodiment of the present disclosure, the presetting information includes at least one of the number of the plurality of sub-generators, a coupling mode among the plurality of sub-generators and a subject of the digital work, without limited thereto.

Optionally, in the embodiment of the present disclosure, the digital work includes at least one of image work, video work, audio work and literary work, without limited thereto.

In an optional example of the embodiment of the present disclosure, the digital work can be a painting work; the user who uploads an initial painting work can designate total five participators to operate the initial painting work through the presetting information, and can designate a subject of the painting work by using key words such as "summer", "happy" or "school", so that the participators can operate (e.g., edit) according to the subject of the painting work. In one of possible implementations, the painting work can be operated by only one participator every single time, and then passed to a next participator who proceeds with the operation on the basis of the paining work output by the previous participator, until the last participator finishes operating the paining work. In another possible implementation, the painting work can be operated by multiple participators, respectively, every single time, so as to generate a plurality of intermediate painting works, which are then operated by other participator(s).

It should be appreciated that, the digital work in the embodiment of the present disclosure can have other forms in addition to those forms listed above. Any information that is related to operating the digital work can be configured as the presetting information, without particularly described one by one herein.

Optionally, in the embodiment of the present disclosure, given that the connecting/coupling mode among the plurality of sub-generators includes cascaded coupling, the processing unit 103 processes the initial content and the intermediate partial content generated by the last sub-generator of the generating unit 102, so as to finally generate one digital work.

In an optional example of the embodiment of the present disclosure, by using the generating unit with a structure illustrated in FIG. 2, the initial content of the digital work can be operated by five participators, successively, in such a manner that a content generated by an operation of a previous participator is passed to a next participator for operating. That is to say, the content output by the fifth participator will be one intermediate partial content generated upon operation by all of the five participators. Subsequently, the processing unit 103 processes the initial content and the intermediate partial content output by the fifth participator, so as to finally generate one digital work.

Optionally, in the embodiment of the present disclosure, given that the connecting/coupling mode among the plurality of sub-generators includes parallel coupling, the processing unit 103 processes the initial content and the intermediate partial content output by each of the plurality of sub-generators, so as to finally generate a plurality of digital works.

In an optional example of the embodiment of the present disclosure, by using the generating unit with a structure illustrated in FIG. 3, the initial content of the digital work can be operated by five participators, simultaneously, so as to generate five intermediate partial contents. Subsequently, the processing unit 103 processes the initial content and the intermediate partial contents output by the five participators, respectively, so as to finally generate five digital works.

Optionally, in an embodiment of the present disclosure, given that the connecting/coupling mode among the plurality of sub-generators includes a combination of cascaded coupling and parallel coupling and given that the parallel coupling includes at least one parallel branch, the initial content and the intermediate partial content output by the last sub-generator of each parallel branch are processed, so as to generate digital work(s), of which the number is corresponding to the number of the parallel branch.

In an optional example of the embodiment of the present disclosure, by using the generating unit with a structure illustrated in FIG. 4, the initial content of the digital work can be operated through three branches in such a manner that a content generated by a sub-generator in each of the three branches is passed to a next sub-generator in this parallel branch for operating, so as to generate three intermediate partial contents corresponding to the three branches. Subsequently, the processing unit 103 processes the initial content and the intermediate partial content made by a last participator of each of the three branches, so as to finally generate three digital works.

Figure 5:
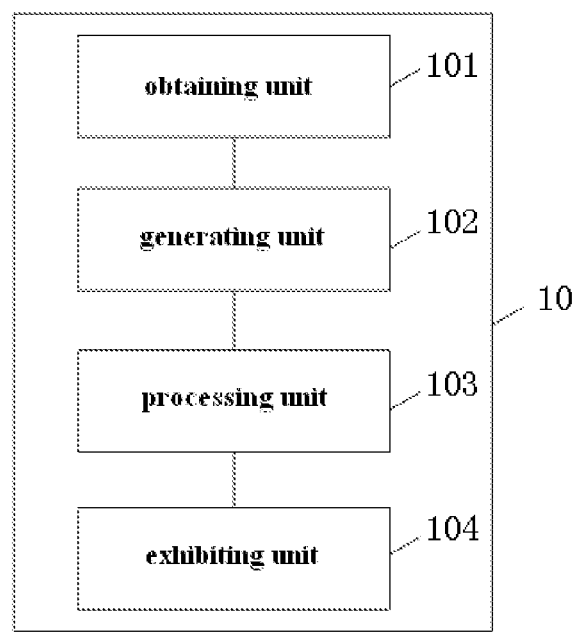
FIG. 5 is a structural diagram illustrating another digital work generating device provided by an embodiment of the present disclosure.

FIG. 5 is a structural diagram illustrating another digital work generating device provided by an embodiment of the present disclosure. As illustrated in FIG. 5, the digital work generating device 10 provided by the present embodiment is different from the digital work generating device illustrated in FIG. 1 in further including an exhibiting unit 104.

The exhibiting unit 104 is coupled with the processing unit 103 and is configured to exhibit the digital work(s) generated by the processing unit 103.

Figure 6:
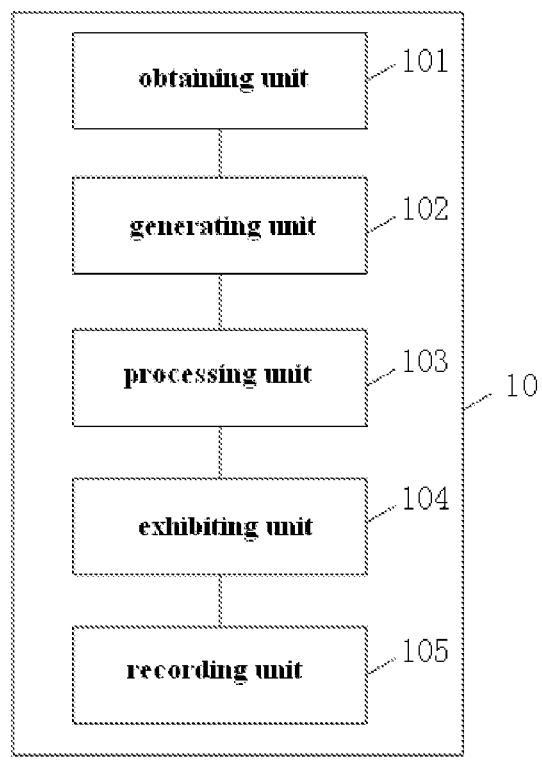
FIG. 6 is a structural diagram illustrating yet another digital work generating device provided by an embodiment of the present disclosure.

FIG. 6 is a structural diagram illustrating yet another digital work generating device provided by an embodiment of the present disclosure. As illustrated in FIG. 6, the digital work generating device 10 provided by the present embodiment is different from the digital work generating device illustrated in FIG. 5 in further including a recording unit 105.

The recording unit 105 is coupled with the generating unit 102 and the exhibiting unit 104, and is configured to record processing information of processing the initial content and the partial content, and to record identification information of the sub-generator corresponding to the processing information.

In the present embodiment, the exhibiting unit 104 is further configured to exhibit processing information of each of the sub-generators according to the identification information of the sub-generator.

It should be explained that, in the embodiment of the present disclosure, the recording unit 105 records information of operating process of each of the participators on the digital work, and the exhibiting unit 104 exhibits the operating process to all the participators in a form of animation, so that each of the participators can find an operating inspiration from the animation during his/her operating process, which is also beneficial to the communication and interaction between different participators.

Figure 7:
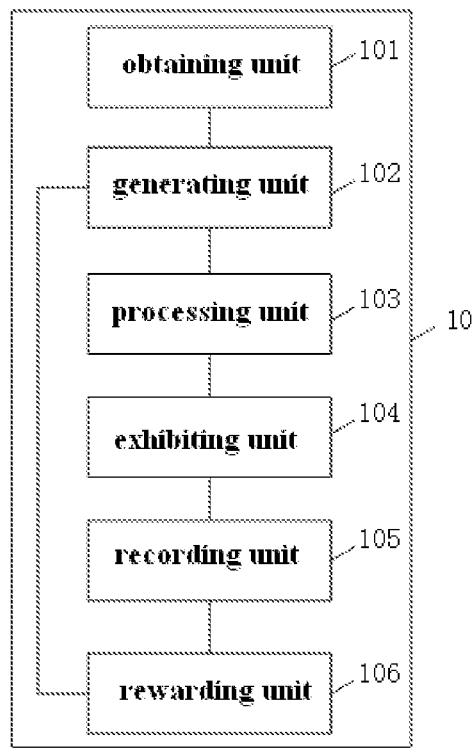
FIG. 7 is a structural diagram illustrating further another digital work generating device provided by an embodiment of the present disclosure.

FIG. 7 is a structural diagram illustrating further another digital work generating device provided by an embodiment of the present disclosure. As illustrated in FIG. 7, the digital work generating device 10 provided by the present embodiment is different from the digital work generating device illustrated in FIG. 6 in further including a rewarding unit 106.

The rewarding unit 106 is configured to send rewarding information to the sub-generator in the generating unit 102.

Optionally, in the embodiment of the present disclosure, one or more excellent digital work can be selected from a plurality of finished digital works by voting. For example, one digital work can be selected as the best one, the corresponding participator can be searched according to the identification information of the participator as recorded in the recording unit 105, and a reward can be sent to this participator. If the digital work selected as the best one is uploaded onto the network or is auctioned and if an earning is obtained, a profit from the earning can be provided to the participator(s) of the selected digital work, so as to motivate the participator(s) to share a digital work or to participate in operating a digital work, thereby improving the enthusiasm of the participator(s).

The digital work generating device provided by the embodiment of the present disclosure allows a plurality of users to collectively generate a digital work, so that not only the finished digital work but also the entire operating process of generating the digital work can be shared among the plurality of users, which is beneficial to the communication and interaction between the uploader of the initial content of the digital work and other participator(s); furthermore, it also allows to reward the participator(s) by reasonable motivation patterns, so as to improve the activity of the participator(s).

Figure 8:
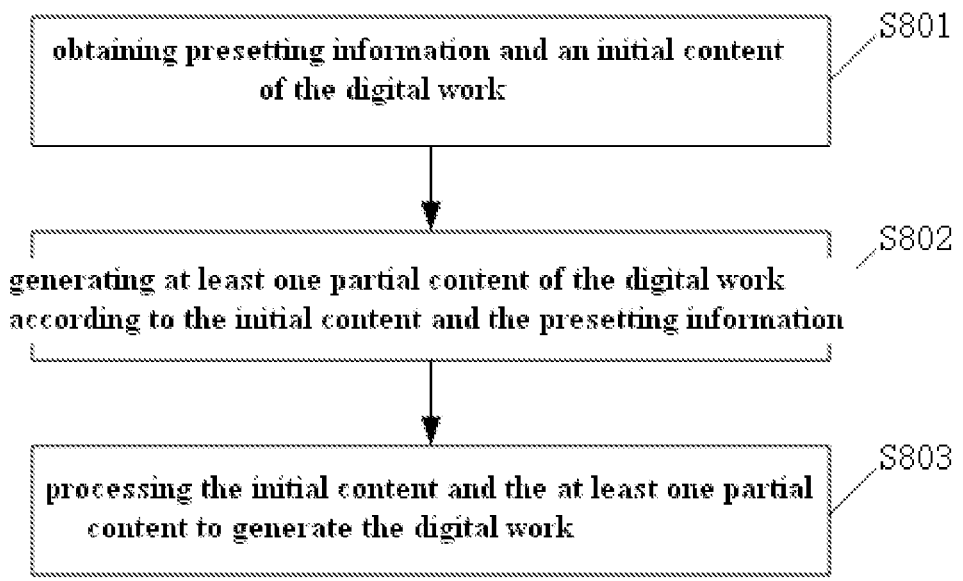
FIG. 8 is a flow chart illustrating a digital work generating method provided by an embodiment of the present disclosure.

Based on the same inventive concept, an embodiment of the present disclosure further provides a digital work generating method. FIG. 8 is a flow chart illustrating a digital work generating method provided by an embodiment of the present disclosure. As illustrated in FIG. 8, the digital work generating method can include steps S801-S803 as below.

S801, obtaining presetting information and an initial content of the digital work.

S802, generating at least one partial content of the digital work according to the initial content and the presetting information.

S803, processing the initial content and the at least one partial content to generate the digital work.

Figure 9:
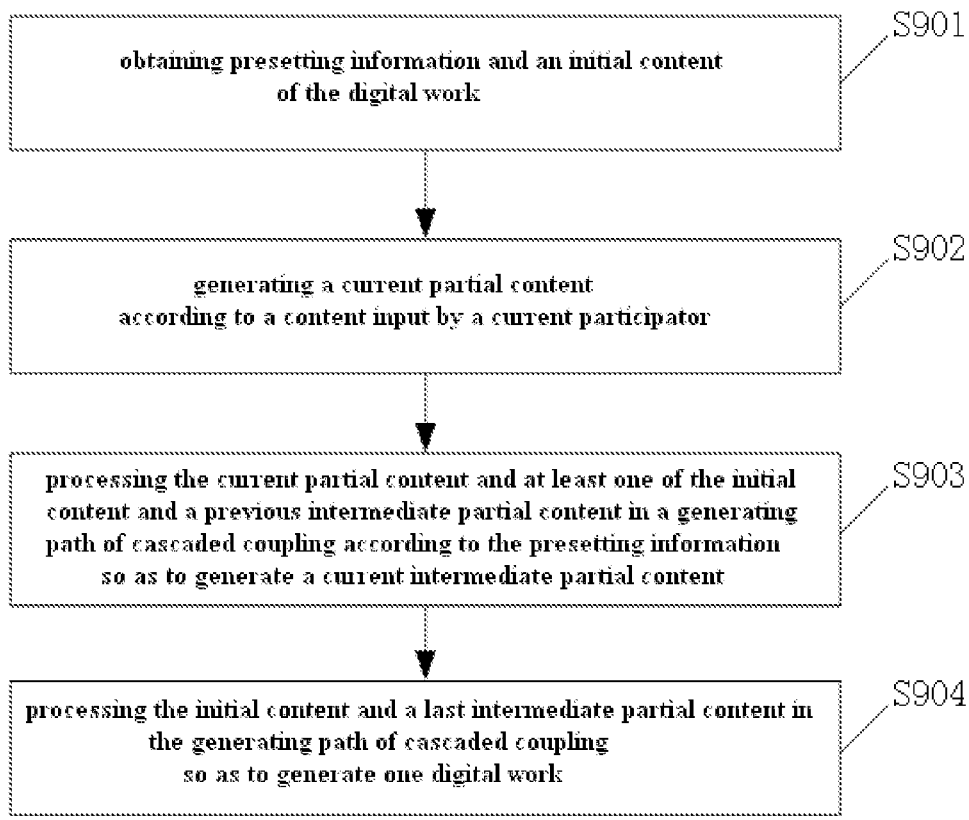
FIG. 9 is a flow chart illustrating another digital work generating method provided by an embodiment of the present disclosure.

On the basis of the digital work generating method illustrated in FIG. 8, FIG. 9 illustrates a digital work generating method provided by another embodiment of the present disclosure, including steps S901-S904 as below.

S901, obtaining presetting information and an initial content of the digital work.

S902, generating a current partial content according to a content input by a current participator.

S903, processing the current partial content and at least one of the initial content and a previous intermediate partial content in a generating path of cascaded coupling according to the presetting information, so as to generate a current intermediate partial content.

S904, processing the initial content and a last intermediate partial content in the generating path of cascaded coupling, so as to generate one digital work.

Figure 10:
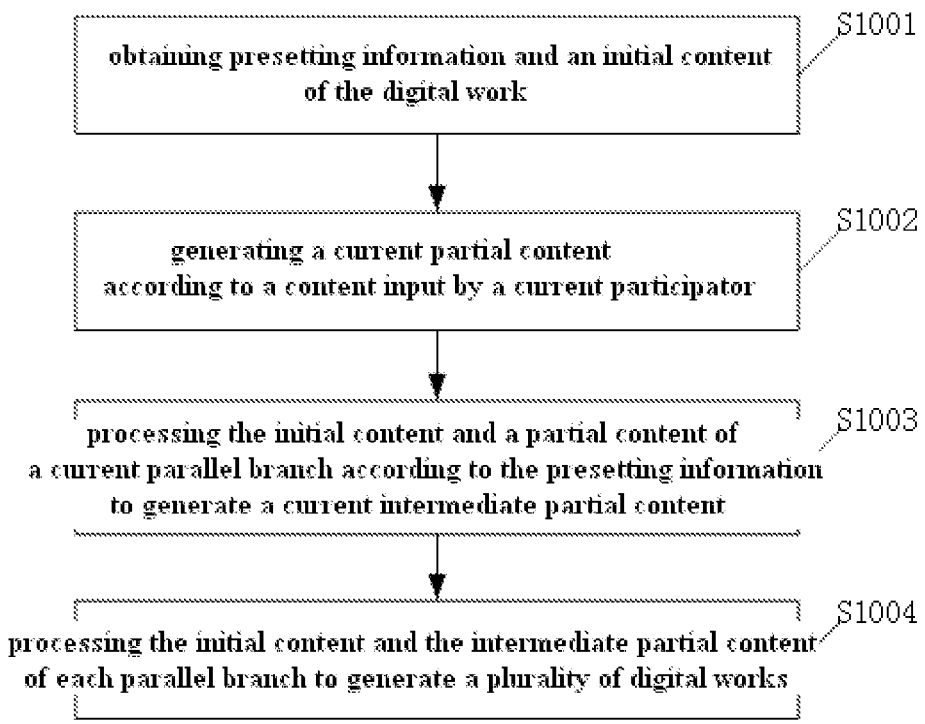
FIG. 10 is a flow chart illustrating yet another digital work generating method provided by an embodiment of the present disclosure.

On the basis of the digital work generating method illustrated in FIG. 8, FIG. 10 illustrates a digital work generating method provided by yet another embodiment of the present disclosure, including steps S1001-S1004 as below.

S1001, obtaining presetting information and an initial content of the digital work.

S1002, generating a current partial content according to a content input by a current participator.

S1003, processing the initial content and a partial content of a current parallel branch according to the presetting information, so as to generate a current intermediate partial content.

S1004, processing the initial content and the intermediate partial content of each parallel branch, so as to generate digital work(s). The number of the digital work(s) is identical to the number of the parallel branch(s).

Figure 11:
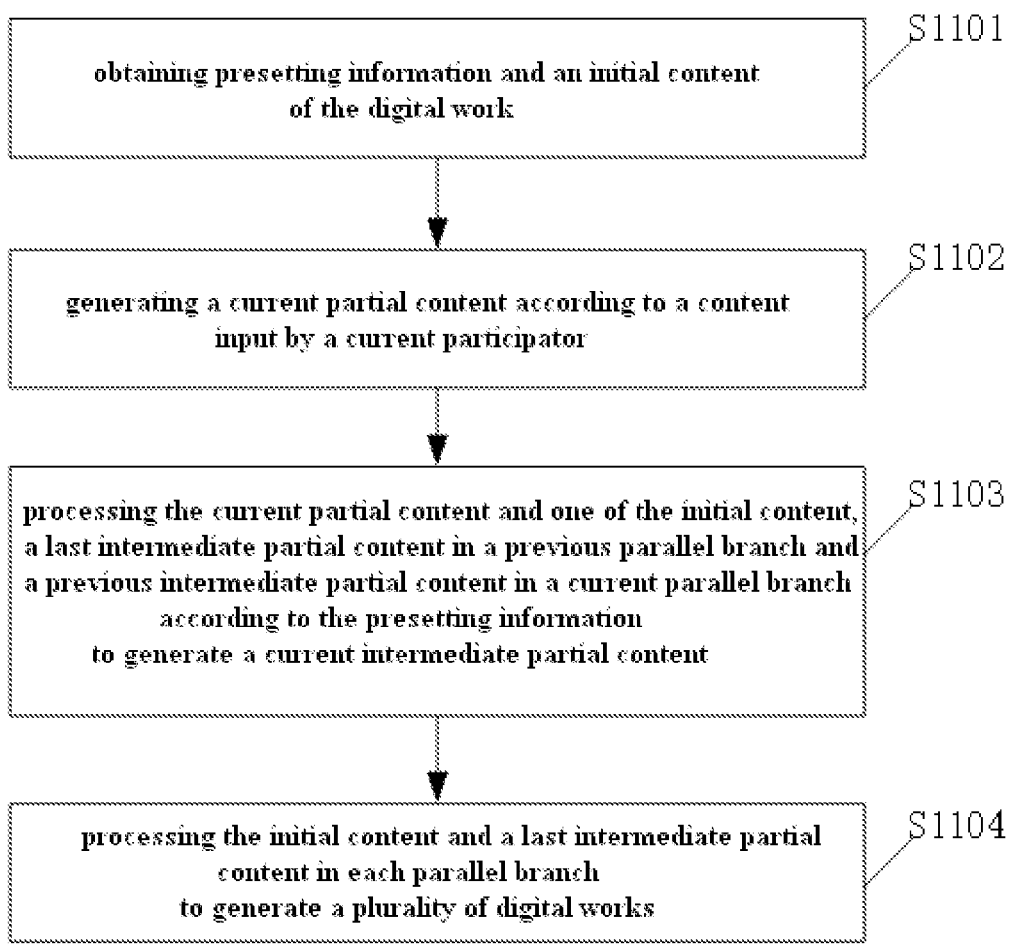
FIG. 11 is a flow chart illustrating further another digital work generating method provided by an embodiment of the present disclosure.

On the basis of the digital work generating method illustrated in FIG. 8, FIG. 11 illustrates a digital work generating method provided by further another embodiment of the present disclosure, including steps S1101-S1104 as below.

S1101, obtaining presetting information and an initial content of the digital work.

S1102, generating a current partial content according to a content input by a current participator.

S1103, processing the current partial content and one of the initial content, a last intermediate partial content in a previous parallel branch and a previous intermediate partial content in a current parallel branch according to the presetting information, so as to generate a current intermediate partial content.

S1104, processing the initial content and a last intermediate partial content in each parallel branch, so as to generate digital work(s). The number of the digital work(s) is identical to the number of the parallel branch(s).

Optionally, in the embodiment of the present disclosure, obtaining presetting information can include: obtaining at least one of the number of the participators, a linking relationship between participators and a subject of the digital work.

Optionally, in the embodiment of the present disclosure, the digital work can include at least one of image work, video work, audio work and literary work.

Figure 12:
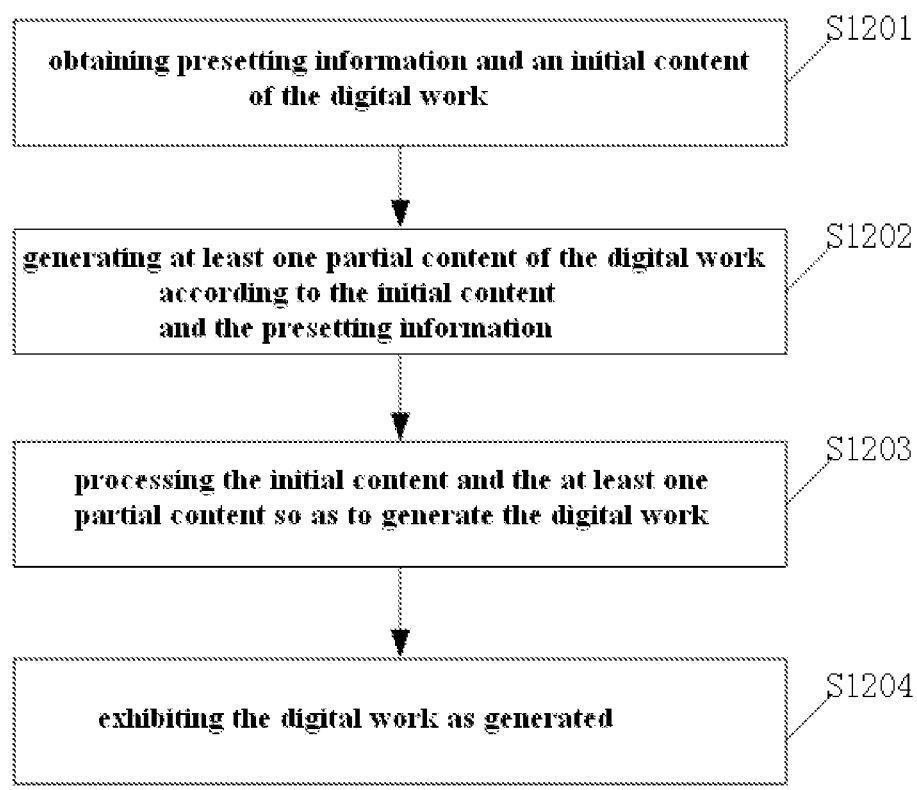
FIG. 12 is a flow chart illustrating still another digital work generating method provided by an embodiment of the present disclosure.

On the basis of the digital work generating method illustrated in FIG. 8, FIG. 12 illustrates a digital work generating method provided by still another embodiment of the present disclosure, including steps S1201-S1204 as below.

S1201, obtaining presetting information and an initial content of the digital work.

S1202, generating at least one partial content of the digital work according to the initial content and the presetting information.

S1203, processing the initial content and the at least one partial content, so as to generate the digital work.

S1204, exhibiting the digital work as generated.

Figure 13:
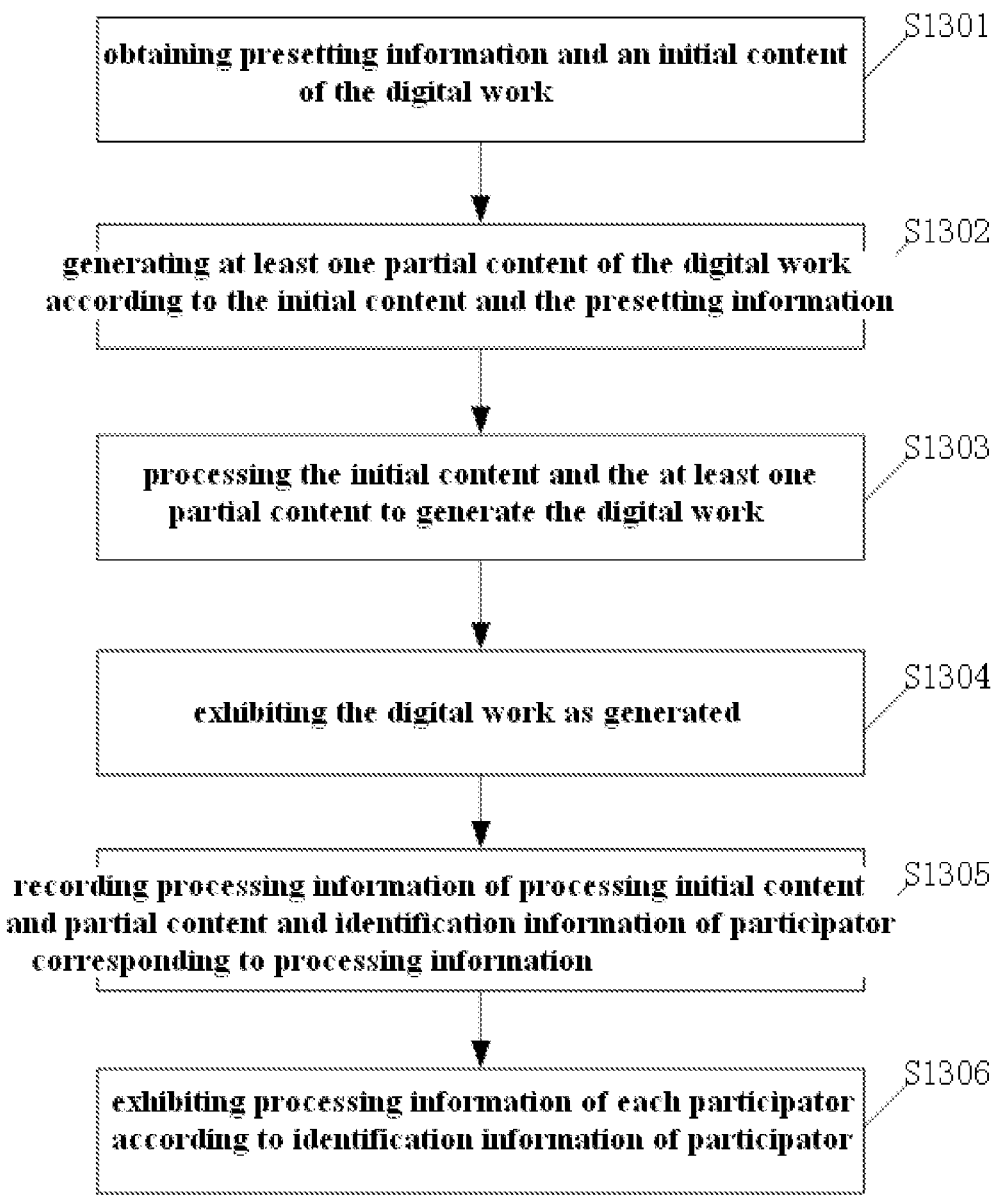
FIG. 13 is a flow chart illustrating further still another digital work generating method provided by an embodiment of the present disclosure.

On the basis of the digital work generating method illustrated in FIG. 12, FIG. 13 illustrates a digital work generating method provided by further still another embodiment of the present disclosure, including steps S1301-S1306 as below.

S1301, obtaining presetting information and an initial content of the digital work.

S1302, generating at least one partial content of the digital work according to the initial content and the presetting information.

S1303, processing the initial content and the at least one partial content to generate the digital work.

S1304, exhibiting the digital work as generated.

S1035, recording processing information of processing the initial content and the partial content and recording identification information of the participator corresponding to the processing information.

S1036, exhibiting the processing information of each participator according to the identification information of the participator.

The digital work generating method provided by the embodiments above can be implemented by the corresponding digital work generating device provided by the foregoing embodiments based on the same principle(s) and inventive concept(s), without particularly described herein.

Based on the same inventive concept, an embodiment of the present disclosure further provides a computer-readable storage medium stored with a computer-readable instruction. The computer-readable instruction, when executed by a processer, is configured to cause the processer to perform the digital work generating method provided by any of the foregoing embodiments.

It should be appreciated that, although various steps in the flow charts of the drawings are illustrated in accordance with an indication of arrows, these steps are not necessary to be performed in a sequence indicated by the arrows. Unless definitely indicated otherwise, these steps can be performed without limitation of particular sequence(s), and can be performed in sequence(s) other than that illustrated in the drawings. Furthermore, at least part of these steps in the flow charts of the drawings can include a plurality of sub-steps or stages which are not necessary to be performed at the same time but can be performed at different times; moreover, these sub-steps or stages are not necessary to be performed one by one in sequence but can be performed alternately with other steps, or with at least part of the sub-steps or stages of other steps.

The foregoing are merely specific embodiments of the present disclosure, but not limitative to the protection scope of the present disclosure. Within the technical scope disclosed by the present disclosure, any alternations or replacements which can be readily envisaged by one skilled in the art shall be within the protection scope of the present disclosure. Therefore, the protection scope of the invention shall be defined by the accompanying claims.

The present application claims the benefits of Chinese patent application No. 201811159283.9, which was filed on Sep. 30, 2018 and is fully incorporated herein by reference as part of the embodiments of this application.

What is claimed is:

1. A digital work generating device, comprising:
  a processor;
  an obtaining means configured to obtain presetting information and an initial content of the digital work;
  a generating means configured to generate at least one partial content of the digital work according to the initial content and the presetting information; and
  a processing means configured to process the initial content and the at least one partial content to generate the digital work;
  wherein the generating means comprises a plurality of generating sub-means;
  a coupling mode among the plurality of generating sub-means comprises a combination of cascaded coupling and parallel coupling, and the plurality of generating sub-means comprise at least one parallel branch; and
  each of the plurality of generating sub-means in each parallel branch is configured to:
  generate a partial content of a current generating sub-mean according to a content input by a participator corresponding to the current generating sub-mean; and
  process the partial content generated by the current generating sub-means and one of the initial content, an intermediate partial content output by a last generating sub-means of a previous parallel branch and an intermediate partial content generated by a previous generating sub-means in a current parallel branch according to the presetting information, so as to generate an intermediate partial content of the current generating sub-means.

2. The digital work generating device according to claim 1, wherein the presetting information comprises at least one of: the number of the plurality of generating sub-means, a coupling mode of the plurality of generating sub-means, and a subject of the digital work.

3. The digital work generating device according to claim 1, wherein the digital work comprises at least one of image work, video work, audio work and literary work.

4. The digital work generating device according to claim 1, wherein
  the processing means is configured to process the initial content and an intermediate partial content generated by a last generating sub-means in each parallel branch, so as to generate a plurality of digital works.

5. The digital work generating device according to claim 1, further comprising:
  an exhibiting means configured to exhibit the digital work generated by the processing means.

6. The digital work generating device according to claim 5, further comprising a recording means,
  the recording means is configured to record processing information of processing the initial content and the partial content, and to record identification information of the generating sub-means corresponding to the processing information; and
  the exhibiting means is further configured to exhibit the processing information of each of the plurality of generating sub-means according to the identification information of the generating sub-means.

7. A digital work generating method, comprising:
  obtaining presetting information and an initial content of the digital work;
  generating at least one partial content of the digital work according to the initial content and the presetting information; and
  processing the initial content and the at least one partial content to generate the digital work, wherein
  generating at least one partial content of the digital work according to the initial content and the presetting information comprises: generating a current partial content according to a content input by a current participator; and processing the current partial content and one of the initial content, a last intermediate partial content in a previous parallel branch and a previous intermediate partial content in a current parallel branch according to the presetting information, so as to generate a current intermediate partial content.

8. The digital work generating method according to claim 7, wherein obtaining presetting information comprises: obtaining at least one of: the number of participators, a linking relationship between participators, and a subject of the digital work.

9. The digital work generating method according to claim 7, wherein the digital work comprises at least one of image work, video work, audio work and literary work.

10. The digital work generating method according to claim 7, wherein
  processing the initial content and the at least one partial content to generate the digital work comprises: processing the initial content and a last intermediate partial content in each parallel branch, so as to generate a plurality of digital works.

11. The digital work generating method according to claim 7, further comprising:
  exhibiting the digital work as generated.

12. The digital work generating method according to claim 11, further comprising:
  recording processing information of processing the initial content and the partial content, and recording identification information of the participator corresponding to the processing information; and exhibiting the processing information of each participator according to the identification information of the participator.

13. A non-transitory computer-readable storage medium stored with a computer readable instruction, wherein the computer-readable instruction, when executed by a processer, is configured to cause the processor to perform a digital work generating method comprising:

obtaining presetting information and an initial content of the digital work;

generating at least one partial content of the digital work according to the initial content and the presetting information; and processing the initial content and the at least one partial content to generate the digital work, wherein generating at least one partial content of the digital work according to the initial content and the presetting information comprises: generating a current partial content according to a content input by a current participator; and processing the current partial content and one of the initial content, a last intermediate partial content in a previous parallel branch and a previous intermediate partial content in a current parallel branch according to the presetting information, so as to generate a current intermediate partial content.

14. The computer-readable storage medium according to claim 13, wherein obtaining presetting information comprises: obtaining at least one of: the number of participators, a linking relationship between participators, and a subject of the digital work.

15. The computer-readable storage medium according to claim 13, wherein the digital work comprises at least one of image work, video work, audio work and literary work.

16. The computer-readable storage medium according to claim 13, wherein processing the initial content and the at least one partial content to generate the digital work comprises: processing the initial content and a last intermediate partial content in each parallel branch, so as to generate a plurality of digital works.

17. The computer-readable storage medium according to claim 13, wherein the digital work generating method performed by the processer further comprises:

exhibiting the digital work as generated.

18. The computer-readable storage medium according to claim 17, wherein the digital work generating method performed by the processer further comprises:

recording processing information of processing the initial content and the partial content, and recording identification information of the participator corresponding to the processing information; and exhibiting the processing information of each participator according to the identification information of the participator.

* * * * *